United States Patent [19]

Watanabe et al.

[11] Patent Number: 4,489,335

[45] Date of Patent: Dec. 18, 1984

[54] INK JET PRINTING APPARATUS

[75] Inventors: Masato Watanabe, Hachioji; Kazuhiro Oda, Sayama, both of Japan

[73] Assignee: Konishiroku Photo Industry Co. Ltd., Japan

[21] Appl. No.: 417,906

[22] Filed: Sep. 14, 1982

[30] Foreign Application Priority Data

Sep. 14, 1981 [JP] Japan ........ 56-144977
Sep. 14 1981 [JP] Japan ........ 56-144975

[51] Int. Cl.[3] ........ G01D 18/00
[52] U.S. Cl. ........ 346/140 R
[58] Field of Search ........ 346/140 R

[56] References Cited

U.S. PATENT DOCUMENTS

| | | | |
|---|---|---|---|
| 4,050,078 | 9/1977 | Isayama | 346/140 R |
| 4,123,761 | 10/1978 | Kimura | 346/140 R |
| 4,176,363 | 11/1979 | Kasahara | 346/140 R |
| 4,323,905 | 4/1982 | Reitberger | 346/75 |
| 4,323,908 | 4/1982 | Lee et al. | 346/140 R |

*Primary Examiner*—Joseph W. Hartary
*Attorney, Agent, or Firm*—Finnegan, Henderson, Farabow, Garrett & Dunner

[57] ABSTRACT

An ink jet printing apparatus of the impulse type which has an ejection failure detector. The detector has electrode means for charging ejected droplets, a reception electrode for receiving the charged droplets, and a circuit for detecting the approach and arrival of the charged droplets at the reception electrode. An ejection failure detection causes a nozzle purging operation.

8 Claims, 7 Drawing Figures

INK JET PRINTING APPARATUS

BACKGROUND OF THE INVENTION

1. Field of the Invention

The present invention relates to an impulse jet type ink jet printing apparatus having a multi-nozzle printing head and more particularly to the impulse jet type ink jet printing apparatus wherein a printing head having a plurality of nozzles is moved while keeping a moderate clearance against a recording paper and ink droplets are selectively ejected from each nozzle to record characters and diagrams on the paper.

2. Description of the Prior Art

In the ink jet printing apparatus of the type that ejects ink droplets only when it is needed to do so, ejection-failures, i.e., the failure of ink droplets to be ejected when needed, are caused by dust adhering to the nozzle and by bubbles entering the printing head. In the conventional impulse jet type ink jet printing apparatus, ejection-failure has been detected with the eye and all steps from the detection through the recovery action have been done manually, which has been troublesome and time-consuming.

SUMMARY OF THE INVENTION

The present invention has been devised in consideration of aforesaid problems and it is an object of the invention to provide an ink jet printing apparatus wherein no manual operation is needed and the recovery action for an ejection-failure can be completed in a short period of time with a construction wherein a printing head is moved automatically to an ejection failure detecting position every certain number of times of scanning by the printing head and the detecting action for the ejection-failure is made when the head is at the failure detecting position by causing ink droplets to be ejected from each nozzle of the printing head and when the ejection-failure is detected, the printing head is moved to the purge position for the forced ejection of the ink.

The above object can be accomplished by an ink jet printing apparatus comprising a printing head having at least one nozzle for ejecting an ink droplet to a recording medium, a moving means for moving said printing head along said recording medium, an ejection failure detector for detecting an ejection failure by causing ink droplets to be ejected from each nozzle every certain number of times of scanning of the recording medium by the printing head, and a purging means for purging said nozzle by causing the ink to be ejected forcibly from said nozzle by moving said printing head to the purging position by said moving means.

DETAILED DESCRIPTION OF THE PREFERRED EMBODIMENTS

Figure 1:
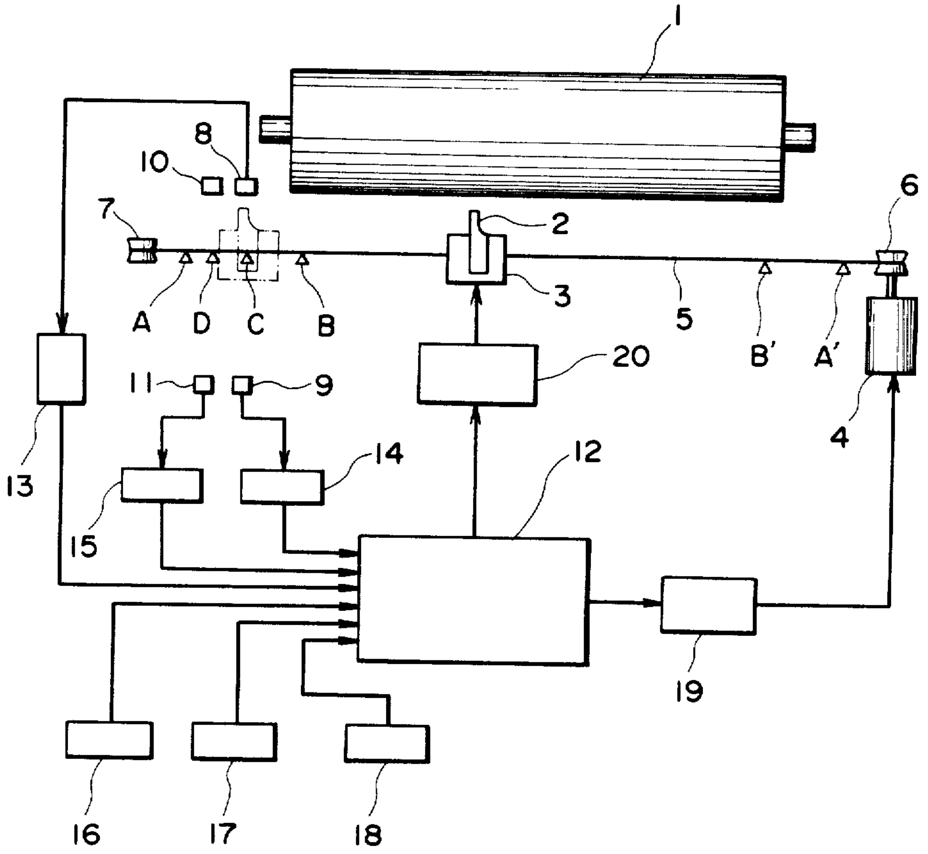
FIG. 1 shows a schematic view of an embodiment of the ink jet printing apparatus of the present invention.

FIG. 1 represents a schematic diagram showing an example of an ink jet printing apparatus of the present invention. In the figure, the numeral 1 represents a recording paper on a platen and recording is made thereon with the ink droplets ejected from the nozzles of a printing head 2. The printing head 2 having plural nozzles is mounted on a carriage 3. The carriage 3 is connected to a conveyance belt 5 which is spread over a driving pulley 6 fixed to an output axle of a pulse motor 4 and a tension pulley 7. Such construction enables the printing head 2 to travel within a range of movement denoted by AA' in FIG. 1 range. The BB' section within a range AA' represents a distance over which the printing head 2 travels facing the recording paper 1. A position C is a spit position where the printing head 2 ejects ink droplets from all nozzles successively for the purpose of detecting the ejection-failure. A position D is a purge position where the forced ejection of the ink is made when the ejection-failure is detected.

In the neighborhood of spit position C, there are provided an ejection-failure detector 8 and a position detector 9 that detects when printing head 2 is positioned at the spit position. Further, in the neighborhood of purge position D, there are provided an ink sink 10 to accept ink ejected from each nozzle and a position detector 11 that detects when printing head 2 is positioned at the purge position. Position detectors 9 and 11 can comprise microswitches, photoelectric detectors and magnetic detectors etc. Numeral 12 represents a controlling section to control various operations described below.

Controlling section 12 generates a controlling signal to a motor driving section 19 or a head driving section 20. The controlling signal is determined by controlling section 12 in accordance with output signals received from a detecting circuit 13 that processes the signals from the ejection-failure detector 8, an amplifier 14 that amplifies an output signal of the position detector 9, an amplifier 15 that amplifies an output signal of the position detector 11, a timer 16, a power source switch 17 and an external print commanding section 18.

Figure 2:
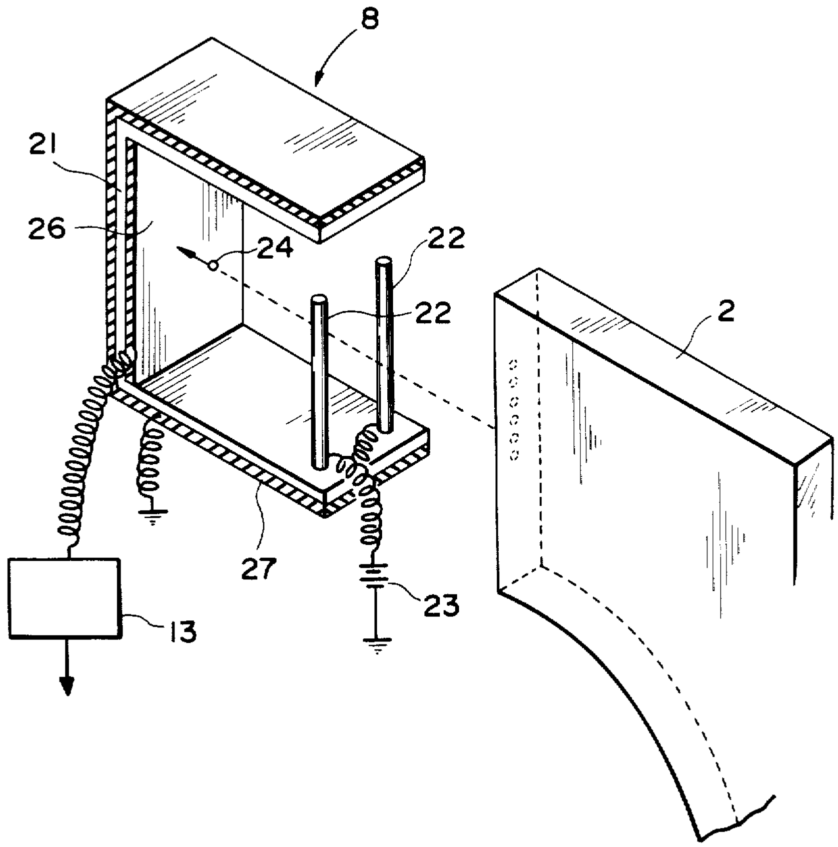
FIG. 2 shows a perspective view of an embodiment of the ejection-failure detector of the present invention.
Figure 3:
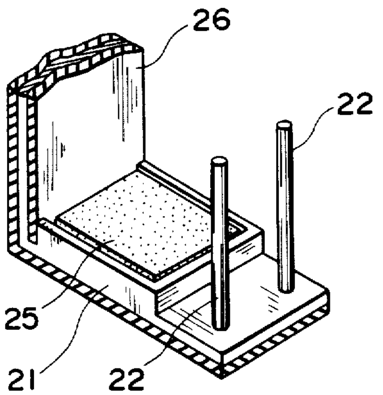
FIG. 3 shows a perspective view of an another desirable example of the ejection-failure detector of the present invention.

The detailed structure of the ejection-failure detector 8 and the detecting circuit 13 will be explained with reference to FIGS. 2, 3 and 4. In FIG. 2 showing the structure of the ejection-failure detector 8, numeral 21 designates a U-shaped base made of an insulating material. Numeral 22 represents a pair of charging electrodes to be closely arranged near the nozzles of the printing head 2. A positive voltage from D.C. power source 23 is applied to electrodes 22 (it is possible to apply the negative voltage to electrodes). The ink in the printing head 2 is kept at the grounding (zero) voltage. An electron is attracted to the ink located at a nozzle portion due to the positive voltage applied to electrodes 22. Therefore, when ink droplet 24 is ejected from the nozzle at the spit position C, the electron is captured inside said ink droplet 24. Ink droplet 24 collides with a reception electrode 26 after passing between the charging electrodes 22, 22 and flows under the base 21.

The reception electrode 26 is given an electric charge by ink droplets 24 which are charged by charging electrodes 22, 22 and fly and collide with the reception electrode 26. An electric charge given to the reception electrode 26 is converted to an electric signal with a moderate level by detecting circuit B. Further, the outside of the base 21 is covered with an electrostatic shield member 27 and is grounded to be electrostatically shielded against charging electrodes 22 and the reception electrode 26. Incidentally, ink droplet 24 collides with the reception electrode 26 after passing between the charging electrodes 22, 22 and flows under the base 21 and therefore, it is desirable that an ink collecting member such as a sponge 25, for example, be provided thereunder as shown in FIG. 3.

Figure 4:
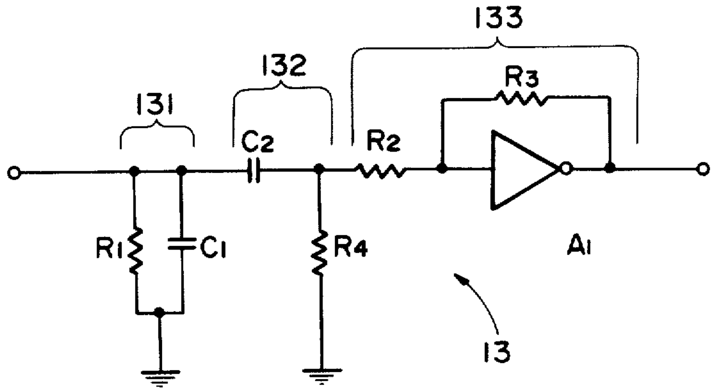
FIG. 4 shows an electric circuit diagram showing a detecting circuit of an embodiment of the ejection-failure detector of the present invention.

The detecting circuit 13 comprises, as shown in FIG. 4, a charging-discharging circuit B1 that comprises a condenser C1 and a resistance R1. As shown in FIG. 2, detecting circuit 13 is grounded to the reception electrode 26 in the ejection-failure detector 8. Referring again to FIG. 4, detecting circuit 13 further comprises a differential circuit 132 comprising a condenser C2 and a resistance R4, and an amplifying circuit 133 comprising a reversed amplifier A1 and resistances R2 and R3. Detecting circuit 13 generates a pulse signal to the controlling section 12 each time ink droplets 24 fly to and collide with the reception electrode 26.

Figure 5:
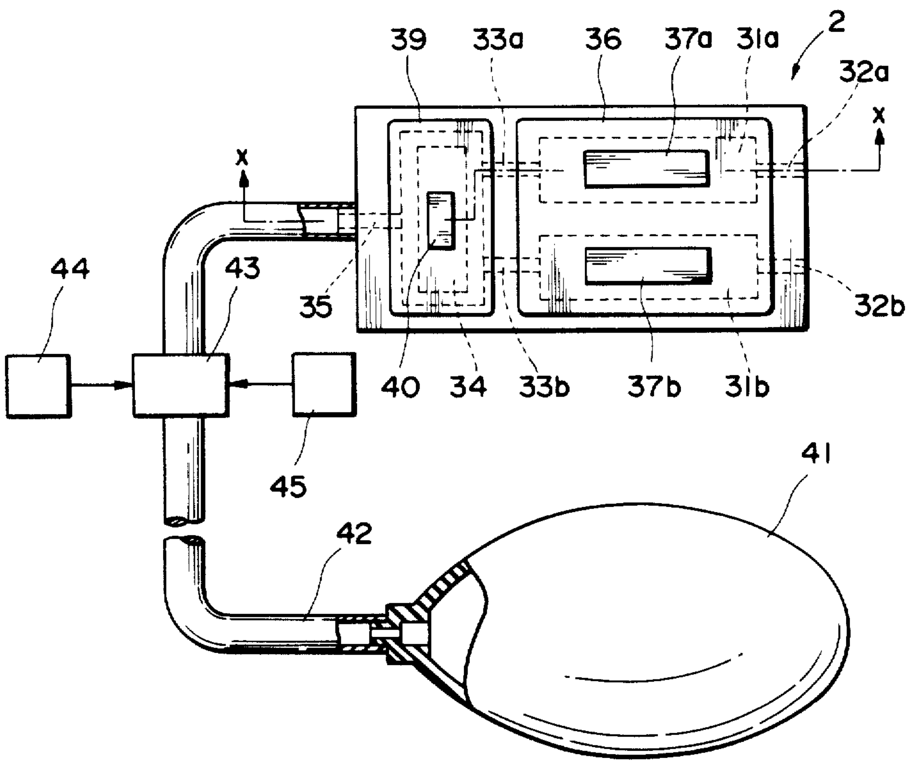
FIG. 5 shows a side view of a printing head using the present invention.
Figure 6:
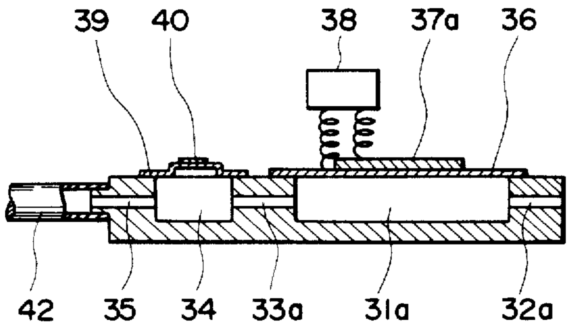
FIG. 6 shows a cross-sectional view taken on line X—X in FIG. 5.

The printing head 2 to be used in the present example of the invention will be explained next referring to FIGS. 5 and 6. The printing head 2 comprises a plurality of ink chambers **31*a*, 31*b*, a plurality of nozzles 32*a*, 32*b*, each communicating with a respective ink chamber for ejecting an ink droplet to the recording paper, a pulse trap chamber 34 communicating with all ink chambers, and a guide passage 35 for feeding the ink into pulse trap chamber 34. Supply passages 33*a* and 33*b* communicate between the pulse trap chamber 34 and respective ink chambers 31*a*, 31*b*. These ink chambers 31*a* and 31*b* are formed to extend in the direction perpendicular to the traveling direction of the printing head 2. At least several, and as many as 20, ink chambers actually are needed to form the strokes in a character, but in the figure, only two ink chambers are shown to facilitate understanding how the printing head operates. The numeral 36 in FIG. 4 designates a cover slip that forms a side wall of ink chambers 31*a* and 31*b*, while numerals 37*a* and 37*b* represent piezoelectric crystals connected onto the cover slip 36 so that these three elements form two flexible wall sections. The numeral 38 in FIG. 6 designates a pulse generator that generates pulses to drive piezoelectric crystals 37*a* and 37*b* based on the output signal of the controlling section 12. Pulse generator 38 is provided in the head driving section 20 shown in FIG. 1. The numeral 39 represents an elastic plate forming the upper lid of the pulse trap chamber 34 and is constructed so that it can be inflated or deflated according to the amount of ink in the pulse trap chamber. The numeral 40 denotes an ink-amount-detecting means provided on the top of the elastic plate 39 to generate signals showing the amount of ink in the pulse trap chamber 34 to the controlling section 12. The numeral 41 designates a balloon container for ink-replenishment and is made of elastic material so that the pressure inside the container keeps a certain pressure (e.g., 0.6–0.1 $kg/cm^2$) owing to the deflating action of the container 41. The numeral 42 represents a connecting pipe to connect the guide passage 35 and the balloon container 41. An automatic valve 43 is provided midway along the length of the connecting pipe 42. A valve-operating means 44 generates the signal to open or close the automatic valve 43 based on the output of the ink-amount-detecting means 40. The numeral 45 in FIG. 5 represents a forced operating means (provided in the head driving section 20) that forcibly opens the automatic valve 43. The forced operating means 45 can open the automatic valve 43 with the output signals of the controlling section 12, even when the automatic valve 43 is being controlled by the valve-operating means 44. Ink can be ejected outside from the nozzles 32*a* and 32*b* with the deflating action of the balloon container 41 and thereby the ink passage from the outlet of the balloon container 41 to the nozzles 32*a* and 32*b* of the printing head 2** can be purged.

Figure 7:
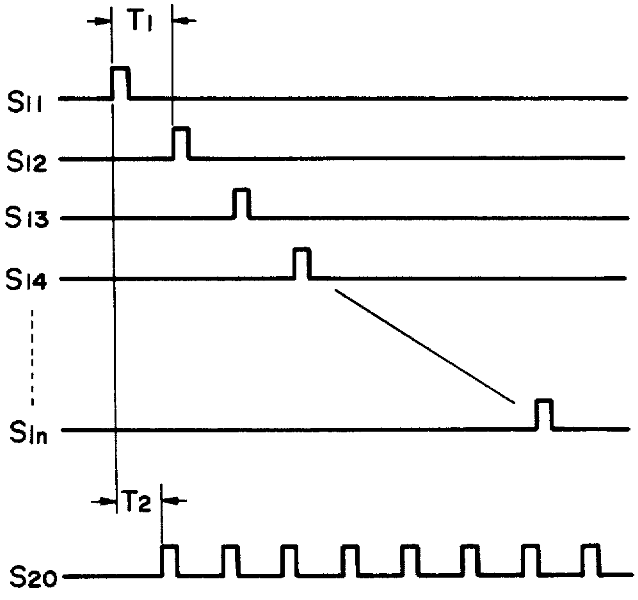
FIG. 7 shows an explanatory diagram for the actions of an embodiment of an ink jet printing apparatus of the present invention.

Next, the actions of the ink jet printing apparatus of present examples will be explained, referring to FIG. 7. Incidentally, the ejecting action of ink droplets made from the nozzles **32*a* and 32*b* during printing, the ink replenishment action from the pulse trap chamber 34 to pressure chambers 31*a* and 31*b*, and further the automatic conveying action of ink into pulse trap chamber 34**, are all similar to those of the ink jet printing apparatus that has widely been known, and therefore any explanation thereof will be omitted here.

An ink jet printing apparatus of the present invention prints with the printing head 2 scanning the recording paper under the control of the controlling section 12. On this occasion, the controlling section 12 causes the printing head 2 to move to the spit position C once during every certain period of time (e.g., 90 seconds). The appropriate time for stopping the printing head 2 is determined based on the detected signals from the position detector 9. Printing head 2 stops precisely at the position C. Then, the controlling section 12 starts the spitting action. Namely, as shown in FIG. 7, it causes pulse signals S11, S12, S13 . . . S1n (n: number of nozzles) that drive nozzles successively with an interval of a certain period T1 (e.g., 5 ms) to be transmitted from the head driving section 20 to the printing head 2. Ink droplets ejected from each nozzle are charged by the operation of the charging electrode 22 of the ejection-failure detector 8. When these ink droplets fly and collide against the reception electrode 26 after the lapse of a certain time T2, a plurality of signals S20 shown in FIG. 7 are generated from the detecting circuit 13 and transmitted to the controlling section 12. The controlling section 12 monitors whether the pulses corresponding to driving pulses S11, S12 . . . S1n exist in the signals S20. If at least one corresponding pulse is missing, it is judged that ejection-failure is taking place and the printing head 2 is moved to the purge position D, where forced operation means 45 is operated and ink passages in the printing head 2 are purged simultaneously. This clears clogging. After the completion of the purge, the controlling section 12 returns the printing head 2 to the printing section BB' and resumes the printing work. Incidentally, when the ejection-failure is not detected during the aforesaid spit operation, the printing head returns to the printing position without going to the purge operation.

Next, the actions of the ejection-failure detector related to the present invention will be explained.

The ink jet printing apparatus performs the printing function with the printing head 2 scanning within a predetermined printing section, such as BB' of FIG. 1. When the ejection-failure detector of the present invention is used, it is desirable to move the printing head 2 to the ejection-failure detecting position once during every certain number of times of scanning of the recording paper by the printing head. It also is desirable to eject ink droplets successively from all nozzles with a certain interval between the successive ejections. Each ink droplet 24 ejected from the printing head 2 passes between charging electrodes 22 and collides with the reception electrode 26. After the collison, the ink itself is absorbed into sponge 25 and the electric charge given to the reception electrode 26 by the collision of ink droplets generates the voltage on charging-discharging circuit 131. This voltage becomes the output of detecting circuit 13 after passing through a differential circuit 132 and an amplifying circuit 133. Therefore, the output signals of the detecting circuit 13 are the pulse signals that show the ejection of ink droplet 24. If ink droplet 24 is ejected with an interval of a certain period of time from each nozzle of the printing head 2, the pulse signals of detecting circuit 13 become the signals having a certain interval. Therefore, an omission of the pulse in the output signals of the detecting circuit 13 changes the interval and causes controlling section 12 to judge that the ejection-failure is taking place.

Incidentally, the pulse-omission-detecting means in the output signal of such detecting circuit 13 can be one wherein the ejection-failure signal is generated when a discordance takes place in the comparison between the ejection-commanding signal, which is a standard signal and is generated when the ejection-failure is detected, and the output signal of the detecting circuit 13. In an alternative type of pulse-omission detection means, the ejection-failure signal is generated when the output signals of the detecting circuit 13 are counted during the detecting time and the counted value does not reach the designated value established in advance. Both such pulse-omission detecting means are available.

In the aforesaid example, the charging electrode 22 forms a pair of bars, but it may be formed in a cylindrical shape, through the inside of which ink droplet 24 is able to pass. Further, the shape of the reception electrode 26 or the base 21 does not need to be limited to the one in the example.

In the aforesaid example, the ejection-failure detector with the charge-amount measuring system is used, but the present invention is not limited to this and it may be another system, e.g., a photoelectric system.

As explained above, the impuse type ink jet printing apparatus is the one wherein the printing head is automatically moved to the ejection-failure detecting position once for every certain number of times of scanning of the recording medium by the printing head, and when the ejection-failure is detected the printing head is moved to the purge position and ink droplets are forcibly ejected. The present invention therefore does not require any manual operation and enables remedial action for the ejection-failure to be taken and completed in a short period of time.

What is claimed is:

1. In an ink jet printing apparatus comprising a printing head having at least one nozzle for ejecting an ink droplet to a recording medium and means for moving said printing head along said recording medium, the improvement comprising:

(a) an ejection failure detector comprising:

(i) electrode means including at least one electrode for charging an ink droplet ejected from each nozzle, the printing head being moved opposite said ejection failure detector to a spit position by said moving means at predetermined time intervals corresponding to a certain number of times of scanning of said recording medium by said printing head, (ii) a reception electrode positioned opposite the printing head and for receiving the charged ink droplet, (iii) a detecting circuit for detecting the approach and arrival of the charged ink droplet at said reception electrode, and (b) means for purging said nozzle by moving said printing head to a purging position by said moving means and causing the ink to be ejected forcibly from said nozzle when said printing head is at said purging position.

2. An ink jet printing apparatus according to claim 1, wherein the movement of the printing head opposite the ejection failure detector occurs automatically.

3. An ink jet printing apparatus according to claim 1, wherein said apparatus further comprises a position detector for detecting said printing head to be at the spit position.

4. An ink jet printing apparatus according to claim 1, wherein said apparatus further comprises a position detector for detecting said printing head to be at the purging position.

5. An ink jet printing apparatus according to claim 1, wherein said ejection failure detector comprises two charging electrodes for passing the ink droplet between said two charging electrodes.

6. An ink jet printing apparatus according to claim 1, wherein said ejection failure detector further comprises an ink collecting member disposed at the base of the reception electrode and between the charging electrode and the reception electrode.

7. An ink jet printing apparatus according to claim 1, wherein said printing head comprises an ink chamber, a nozzle communicating with said ink chamber for ejecting an ink droplet to a recording medium, and volume displacement means responsive to electrical signals for displacing a predetermined volume of ink in said chamber to eject from said nozzle a droplet of ink.

8. In an ink jet printing apparatus comprising a printing head having at least one nozzle for ejecting an ink droplet onto a recording medium and means for moving said printing head in a direction parallel to said recording medium, the improvement comprising:

an ejection failure detector for detecting an ejection failure at predetermined time intervals corresponding to a certain number of times of scanning of the recording medium by the printing head, said detector causing an ink droplet ejected from each nozzle to be electrically charged; and means for purging said nozzle by causing the ink to be ejected forcibly from said nozzle after said printing head is moved to a purging position by said moving means.

* * * * *